US011238337B2

(12) United States Patent
Voelker et al.

(10) Patent No.: US 11,238,337 B2
(45) Date of Patent: Feb. 1, 2022

(54) METHODS AND SYSTEMS FOR IMPLEMENTING DYNAMIC NEURAL NETWORKS

(71) Applicant: Applied Brain Research Inc., Waterloo (CA)

(72) Inventors: Aaron Russell Voelker, Stittsville (CA); Christopher David Eliasmith, Waterloo (CA)

(73) Assignee: Applied Brain Research Inc., Waterloo (CA)

( * ) Notice: Subject to any disclaimer, the term of this patent is extended or adjusted under 35 U.S.C. 154(b) by 803 days.

(21) Appl. No.: 15/243,223

(22) Filed: Aug. 22, 2016

(65) Prior Publication Data
US 2018/0053090 A1    Feb. 22, 2018

(51) Int. Cl.
 G06N 3/08    (2006.01)
 G06N 3/063    (2006.01)
 G06N 3/04    (2006.01)
 G06N 3/10    (2006.01)

(52) U.S. Cl.
 CPC ............... *G06N 3/08* (2013.01); *G06N 3/049* (2013.01); *G06N 3/063* (2013.01); *G06N 3/10* (2013.01)

(58) Field of Classification Search
 CPC .......... G06N 3/08; G06N 3/049; G06N 3/063; G06N 3/10; G06N 20/00
 USPC ........................................................... 706/20
 See application file for complete search history.

(56) References Cited

U.S. PATENT DOCUMENTS

| 5,253,329 A | * | 10/1993 | Villarreal | ............... | G06N 3/049 706/31 |
| 5,479,571 A | * | 12/1995 | Parlos | .................... | G06N 3/049 706/25 |
| 5,553,195 A | * | 9/1996 | Meijer | .................... | G06N 3/049 706/31 |

(Continued)

FOREIGN PATENT DOCUMENTS

EP    3026600 A2 *  6/2016    ............. G06N 3/082

OTHER PUBLICATIONS

Abbott et al., "Building functional networks of spiking model neurons" Mar. 2016 Nature Neuroscience, vol. 19, No. 3, pp. 350-355 (Year: 2016).*

(Continued)

*Primary Examiner* — Miranda M Huang
*Assistant Examiner* — Chase P. Hinckley
(74) *Attorney, Agent, or Firm* — Bereskin & Parr LLP/S.E.N.C.R.L., s.r.l.

(57) ABSTRACT

A method is described for designing systems that provide efficient implementations of feed-forward, recurrent, and deep networks that process dynamic signals using temporal filters and static or time-varying nonlinearities. A system design methodology is described that provides an engineered architecture. This architecture defines a core set of network components and operations for efficient computation of dynamic signals using temporal filters and static or time-varying nonlinearities. These methods apply to a wide variety of connected nonlinearities that include temporal filters in the connections. Here we apply the methods to synaptic models coupled with spiking and/or non-spiking neurons whose connection parameters are determined using a variety of methods of optimization.

47 Claims, 14 Drawing Sheets

(56) References Cited

U.S. PATENT DOCUMENTS

| | | | | |
|---|---|---|---|---|
| 5,671,336 | A * | 9/1997 | Yoshida | G06N 3/0635 706/30 |
| 5,987,444 | A * | 11/1999 | Lo | G06N 3/08 706/25 |
| 7,788,196 | B2 * | 8/2010 | Buscema | G06N 3/0481 706/25 |
| 8,630,966 | B2 * | 1/2014 | Gage | G06N 3/082 706/25 |
| 9,020,870 | B1 * | 4/2015 | Daily | G06N 3/049 706/20 |
| 9,311,594 | B1 * | 4/2016 | Fisher | G06N 3/049 |
| 9,749,007 | B1 * | 8/2017 | Martin | G01S 7/414 |
| 10,162,378 | B1 * | 12/2018 | Rao | G06F 1/08 |
| 10,204,301 | B2 * | 2/2019 | Amir | G06N 3/063 |
| 10,410,117 | B2 * | 9/2019 | van der Made | G06N 3/049 |
| 2004/0015459 | A1 * | 1/2004 | Jaeger | G06N 3/08 706/15 |
| 2009/0287624 | A1 * | 11/2009 | Rouat | G06K 9/4623 706/20 |
| 2010/0030716 | A1 * | 2/2010 | Calise | G05B 13/027 706/23 |
| 2010/0235310 | A1 * | 9/2010 | Gage | G06N 3/082 706/14 |
| 2010/0312730 | A1 * | 12/2010 | Weng | G06N 3/02 706/15 |
| 2012/0308076 | A1 * | 12/2012 | Piekniewski | G06N 3/049 382/103 |
| 2013/0054500 | A1 * | 2/2013 | Al-Duwaish | G05B 13/027 706/19 |
| 2013/0073080 | A1 * | 3/2013 | Ponulak | B25J 9/1635 700/246 |
| 2013/0073491 | A1 * | 3/2013 | Izhikevich | G06N 3/049 706/15 |
| 2013/0151450 | A1 * | 6/2013 | Ponulak | G06N 3/049 706/25 |
| 2013/0232097 | A1 * | 9/2013 | Shiv | G06N 3/04 706/20 |
| 2013/0311412 | A1 * | 11/2013 | Lazar | G06N 3/08 706/16 |
| 2013/0325774 | A1 * | 12/2013 | Sinyavskiy | G06N 3/049 706/23 |
| 2013/0325776 | A1 * | 12/2013 | Ponulak | G06N 3/08 706/25 |
| 2014/0032458 | A1 * | 1/2014 | Sinyavskiy | G06N 3/049 706/16 |
| 2014/0032459 | A1 * | 1/2014 | Sinyavskiy | G05B 13/025 706/16 |
| 2014/0122397 | A1 * | 5/2014 | Richert | G06N 3/02 706/15 |
| 2014/0180989 | A1 * | 6/2014 | Krizhevsky | G06N 3/063 706/31 |
| 2014/0219497 | A1 * | 8/2014 | Richert | G06K 9/4623 382/103 |
| 2014/0277718 | A1 * | 9/2014 | Izhikevich | B25J 9/163 700/250 |
| 2014/0379623 | A1 * | 12/2014 | Piekniewski | G06N 3/049 706/15 |
| 2015/0106314 | A1 * | 4/2015 | Birdwell | G06F 16/22 706/25 |
| 2015/0170020 | A1 * | 6/2015 | Garimella | G06N 3/082 706/14 |
| 2015/0269481 | A1 * | 9/2015 | Annapureddy | G06N 3/049 706/21 |
| 2015/0269485 | A1 * | 9/2015 | Julian | G06F 17/11 706/25 |
| 2015/0317557 | A1 * | 11/2015 | Julian | G06N 3/049 706/25 |
| 2015/0324684 | A1 * | 11/2015 | Alvarez-Icaza Rivera | G06N 3/049 706/26 |
| 2016/0019456 | A1 * | 1/2016 | Annapureddy | G06N 3/08 706/22 |
| 2016/0019457 | A1 * | 1/2016 | van der Made | G06N 3/08 706/25 |
| 2016/0042271 | A1 * | 2/2016 | Yoon | G06N 3/04 706/25 |
| 2016/0048753 | A1 * | 2/2016 | Sussillo | A61B 5/04001 706/23 |
| 2016/0140434 | A1 * | 5/2016 | Yilmaz | G06N 3/0454 706/31 |
| 2016/0148090 | A1 * | 5/2016 | Lazar | G06N 3/02 341/50 |
| 2016/0162782 | A1 * | 6/2016 | Park | G06N 3/0454 706/17 |
| 2016/0217367 | A1 * | 7/2016 | Moreno | G10L 15/16 |
| 2016/0242690 | A1 * | 8/2016 | Principe | A61B 5/04012 |
| 2016/0247062 | A1 * | 8/2016 | Amir | G06N 3/049 |
| 2016/0283841 | A1 * | 9/2016 | Sainath | G10L 15/16 |
| 2016/0287871 | A1 * | 10/2016 | Bardakjian | A61B 5/04012 |
| 2017/0061283 | A1 * | 3/2017 | Rasmussen | G06N 3/10 |
| 2018/0174053 | A1 * | 6/2018 | Lin | G06N 3/088 |
| 2018/0260711 | A1 * | 9/2018 | Zhang | G06N 3/0481 |
| 2019/0019080 | A1 * | 1/2019 | Claessens | G05B 13/027 |
| 2019/0197410 | A1 * | 6/2019 | Berry, II | G06N 3/049 |

OTHER PUBLICATIONS

Goudarzi et al., "Product Reservoir Computing: Time-Series Computation with Multiplicative Neurons" Jul. 12-17, 2015 IEEE International Joint Conference on Neural Networks (Year: 2015).*

Zhang, Daiyuan "New Algorithm on Neural Networks Using Padé Weight Functions" 2011 Seventh International Conference on Natural Computation (Year: 2011).*

Kasabov et al., "Dynamic evolving spiking neural networks for on-line spatio- and spectro-temporal pattern recognition" 2013 Neural Networks 41 pp. 188-201 (Year: 2013).*

Venkatraman et al., "Dynamically Weighted Time-Delay Neural Networks for Functional Approximation" Jul. 15-19, 2001 IEEE International Joint Conference on Neural Networks (Year: 2001).*

Park et al., "Discrete Synapse Recurrent Neural Network with Tim-Varying Delays for Nonlinear System Modeling and Its Application on Seismic Signal Classification" Jul. 31-Aug. 5, 2011, Proceedings of International Joint Conference on Neural Networks, pp. 2374-2381 (Year: 2011).*

Legenstein et al., "Ensembles of Spiking Neurons with Noise Support Optimal Probabilistic Inference in a Dynamically Changing Environment" Oct. 23, 2014 Institute for Theoretical Computer Science, pp. 1-27. (Year: 2014).*

Shen et al., "Network Structure Shapes Spontaneous Functional Connectivity Dynamics" Apr. 8, 2015 The Journal of Neuroscience, pp. 5579-5588 (Year: 2015).*

Tapson et al., "Synthesis of neural networks for spatio-temporal spike pattern recognition and processing" Aug. 30, 2013, Frontiers in Neuroscience, vol. 7, Article 153, pp. 1-13. (Year: 2013).*

Eliasmith et al., "A neural model of the development of expertise" Jan. 2013. (Year: 2013).*

Sutskever et al., "Generating Text with Recurrent Neural Networks" 2011, Proceedings of the 28th International Conference on Machine Learning. (Year: 2011).*

Sussillo et al., "A recurrent neural network for closed-loop intracortical brain-machine interface decoders" 2012, Journal of Neural Engineering, No. 9, pp. 1-10. (Year: 2012).*

Park et al., "Discrete Synapse Recurrent Neural Network with Time-Varying Delays for Nonlinear System Modeling and Its Application on Seismic Signal Classification" Jul. 31-Aug. 5, 2011, IEEE Proceedings of International Joint Conference on Neural Networks, pp. 2374-2381. (Year: 2011).*

Bohte et al., "The evidence for neural information processing with precise spike-times: A survey" 2004, Natural Computing, No. 3, pp. 195-206. (Year: 2004).*

Downing, Keith L. "Learning via Synaptic Tuning" 2015, MIT Press, Chapter 10, pp. 231-274. (Year: 2015).*

Kantardzic, Mehmed, "Artificial Neural Networks" 2011, Data Mining: Concepts, Models, Methods, and Algorithms, Second Ed., pp. 199-234. (Year: 2011).*

(56) References Cited

OTHER PUBLICATIONS

Yadaiah et al., "DEKF Based Recurrent Neural Network for State Estimation of Nonlinear Dynamical Systems" 2011, IEEE, pp. 311-316. (Year: 2011).*
Bastidas, Jose, "Network Dynamics as an Inverse Problem: Reconstruction, Design, and Optimality" 2015, pp. 1-112. (Year: 2015).*
Bichler et al., "Extraction of temporally correlated features from dynamic vision sensors with spike-timing dependent plasticity" 2012, Neural Networks, No. 32, pp. 339-348. (Year: 2012).*
Cichy et al., "Comparison of deep neural networks to spatio-temporal cortical dynamics of human visual object recognition reveals hierarchical correspondence" Jun. 10, 2016, Nature.com Scientific Reports, pp. 1-13. (Year: 2016).*
Shen et al., "Network Structure Shapes Spontaneous Functional Connectivity Dynamics" Apr. 8, 2015, The Journal of Neuroscience, vol. 35, No. 14, pp. 5588-5579. (Year: 2015).*
Shine et al., "Estimation of dynamic functional connectivity using Multiplication of Temporal Derivatives" Jul. 29, 2015, NeuroImage, No. 122, pp. 399-407. (Year: 2015).*
Su, Ri-Qi, "Reconstructing and Controlling Nonlinear Complex Systems" Dec. 2015, Arizona State University. (Year: 2015).*
Timme et al., "Revealing networks from dynamics: an introduction" Aug. 11, 2014, Journal of Physics A: Mathematical and Theoretical, No. 47, pp. 1-36. (Year: 2014).*
Brabandere et al., "Dynamic Filter Networks" Jun. 6, 2016, pp. 1-14. (Year: 2016).*
Ocker et al., "Self-Organization of microcircuits in networks of spiking neurons with plastic synapses" Dec. 20, 2014, pp. 1-38. (Year: 2014).*
Martin et al., "Artificial neural networks and multivariate statistics" 1999, Statistics and neural networks: Advances at the interface, pp. 195-292. (Year: 1999).*
Dziugaite et al., "Neural Network Matrix Factorization" Dec. 15, 2015, pp. 1-7. (Year: 2015).*
Jimenez-Fernandez et al., "A Binaural Neuromorphic Auditory Sensor for FPGA: A Spike Signal Processing Approach" Jul. 27, 2016, IEEE, pp. 804-818. (Year: 2016).*
Bekolay et al., "Nengo: a Python tool for building large-scale functional brain models" Jan. 6, 2014, Frontiers in Neuroinformatics, vol. 7, No. 48, pp. 1-13. (Year: 2014).*
Truong et al., "Latte: A Language, Compiler, and Runtime for Elegant and Efficient Neural Networks" Jun. 13-17, 2016, pp. 209-223. (Year: 2016).*
Nicola et al., "Obtaining Arbitrary Prescribed Mean Field Dynamics for Recurrently Coupled Networks of Type-I Spiking Neurons with Analytically Determined Weights" Feb. 29, 2016, Frontiers in Computational Neuroscience, pp. 1-23. (Year: 2016).*
Lotter et al., "Deep Predictive Coding Networks for Video Prediction and Unsupervised Learning" Jun. 14, 2016, pp. 1-11. (Year: 2016).*
Searle et al., "Dynamic Adaptive Network Intelligence" Nov. 19, 2015, pp. 1-8. (Year: 2015).*
Aljundi et al., "Lightweight Unsupervised Domain Adaptation by Convolutional Filter Reconstruction" Mar. 23, 2016, pp. 1-16. (Year: 2016).*
Brunel et al., "Single neuron dynamics and computation" 2014, Current Opinion in Neurobiology, No. 25, pp. 149-155. (Year: 2014).*
Shumikhin et al., "Identification of a Complex Control Object with Frequency Characteristics Obtained Experimentally with Its Dynamic Neural Network Model" 2015, pp. 125-134. (Year: 2015).*
Doiron et al., "Balanced neural architecture and the idling brain" May 27, 2014, Frontiers in Computational Neuroscience, vol. 8, No. 56, pp. 1-12. (Year: 2014).*
Piergiovanni et al., "Temporal attention filters for human activity recognition in videos" May 26, 2016, pp. 1-9. (Year: 2016).*
Zaystev et al., "Reconstruction of recurrent synaptic connectivity of thousands of neurons from simulated spiking activity" Jun. 4, 2015, pp. 1-27. (Year: 2015).*
Ortin et al., "A Unified Framework for Reservoir Computing and Extreme Learning Machines based on a Single Time-delayed Neuron" Oct. 8, 2015, pp. 1-11. (Year: 2015).*
Doufana, Mohamed, "Neural Network Approach for Linearization by Adaptive Predistortion of Amplifiers RF Power" Mar. 2009, Thesis University of Quebec, pp. i-95. (Year: 2009).*
Marblestone et al., "Toward an integration of deep learning and neuroscience" Jun. 13, 2016, pp. 1-60. (Year: 2016).*
Yao et al., "Describing Videos by Exploiting Temporal Structure" Oct. 1, 2015. (Year: 2015).*
Zalay, Osbert C., "Cognitive Rhythm Generators for Modelling and Modulation of Neuronal Electrical Activity" 2011, Thesis University of Toronto, pp. i-337. (Year: 2011).*
Huang et al., "Exponential stabilization of delayed recurrent neural networks: A state estimation based approach" 2013, Neural Networks, No. 58: 153-157. (Year: 2013).*
Karbasi et al., "Learning Neural Connectivity from Firing Activity: Scalable Algorithms with Provable Guarantees" 2016. (Year: 2016).*
Dasgupta, Sakyasingha, "Temporal information processing and memory guided behaviors with recurrent neural networks" Jan. 28, 2015, Dissertation, pp. i-173. (Year: 2015).*
Merrienboer et al., "Blocks and Fuel: Frameworks for deep learning" Jun. 1, 2015, pp. 1-5. (Year: 2015).*
Mikolov et al., "Learning Longer Memory in Recurrent Neural Networks" Apr. 16, 2015, pp. 1-9. (Year: 2015).*
Chen et al., "Model Metric Co-Learning for Time-Series Classification" 2015, pp. 3387-3394. (Year: 2015).*
Chien et al., "Bayesian Recurrent Neural Network for Language Modeling" Jan. 18, 2016, pp. 361-374. (Year: 2016).*
Charles et al., "Distributed Sequence Memory of Multidimensional Inputs in Recurrent Networks" May 26, 2016, pp. 1-35. (Year: 2016).*
Couillet et al., "A Random Matrix Approach to Echo-State Neural Networks" Jun. 11, 2016. (Year: 2016).*
Lahiri et Ganguli, "A memory frontier for complex synapses" 2013, pp. 1-9 (Year: 2013).*
Afsari et Vidal, "Model Order Reduction for Discrete-Time LTI Systems Using the Alignment Distance", 2015, pp. 2868-2875. (Year: 2015).*
Arjovsky et al., "Unitary Evolution Recurrent Neural Networks" Jun. 11, 2016. (Year: 2016).*
Zhou et al., "Financial time series prediction using a dendritic neuron model" May 16, 2016, pp. 214-224. (Year: 2016).*
Chen et al., "Efficient movement representation by embedding Dynamic Movement Primitives in Deep Autoencoders" Nov. 2015, pp. 434-440. (Year: 2015).*
Chien et al., "Deep Recurrent Regularization Neural Network for Speech Recognition" 2015, pp. 4560-4564. (Year: 2015).*
Gruslys et al., "Memory-Efficient Backpropagation Through Time" Jun. 10, 2016, pp. 1-14. (Year: 2016).*
Soudry et al., "Memristor-Based Multilayer Neural Networks with Online Gradient Descent Training" Oct. 2015, pp. 2408-2421. (Year :2015).*
Gulcehre et al., "Dynamic Neural Turing Machine with Soft and Hard Addressing Schemes" Jun. 30, 2016, pp. 1-13. (Year: 2016).*
S. Hochreiter and J. Schmidhuber, Long short-term memory. Neural Computation, vol. 9, No. 8, pp. 1735-1780, Nov. 1997.
M. Lukoševičius and H. Jaeger, Reservoir computing approaches to recurrent neural network training. Computer Science Review, vol. 3, No. 3, pp. 127-149, Aug. 2009.
H. Jaeger, The echo state approach to analysing and training recurrent neural networks. German National Research Center for Information Technology Technical Report, vol. 148, p. 34, Jan. 2001.
D. Sussillo and L. F. Abbott, Generating coherent patterns of activity from chaotic neural networks. Neuron, vol. 63, No. 4, pp. 544-557, Aug. 2009.
W. Maass, T. Natschläger, and H. Markram, Real-time computing without stable states: A new framework for neural computation based on perturbations. Neural Computation, vol. 14, No. 11, pp. 2531-2560, Nov. 2002.

(56) References Cited

OTHER PUBLICATIONS

C. Eliasmith and C. Anderson, Neural engineering: Computation, representation, and dynamics in neurobiological systems. MIT Press, 2003.
S. Choudhary, S. Sloan, S. Fok, A. Neckar, Eric, Trautmann, P. Gao, T. Stewart, C. Eliasmith, and K. Boahen, Silicon neurons that compute, in International Conference on Artificial Neural Networks, pp. 121-128, 2012.
M. Khan, D. Lester, L. Plana, A. Rast, X. Jin, E. Painkras, and S. Furber, SpiNNaker: Mapping neural networks onto a massively-parallel chip multiprocessor. IEEE, Jun. 2008.
P. A. Merolla, J. V. Arthur, R. Alvarez-Icaza, A. S. Cassidy, J. Sawada, F. Akopyan, B. L. Jackson, N. Imam, C. Guo, Y. Nakamura, B. Brezzo, I. Vo, S. K. Esser, R. Appuswamy, B. Taba, A. Amir, M. D. Flickner, W. P. Risk, R. Manohar, and D. S. Modha, Artificial brains. A million spiking-neuron integrated circuit with a scalable communication network and interface. Science, vol. 345, No. 6197, pp. 668-673, Aug. 2014.
Trevor Bekolay et al: "Nengo: a Python tool for building large-scale functional brain models", Frontiers in Neuroinformatics, vol. 7 Article 48, Jan. 6, 2014 (Jan. 6, 2014), pp. 1-13, XP055331540, DOI: 10.3389/fninf.2013.00048 * p. 1-p. 11, left-hand column, paragraph 3 *.
Jonathan C. Tapson et al: "Synthesis of neural networks for spatio-temporal spike pattern recognition and processing", Frontiers in Neuroscience, vol. 7, No. 153, Aug. 30, 2013 (Aug. 30, 2013), XP055192522, DOI: 10.3389/fnins.2013.00153 * p. 1-p. 12, right-hand column, paragraph 2.
Swadesh Choudhary et al: "Silicon Neurons 1-14 That Compute", Sep. 11, 2012 (Sep. 11, 2012), Artificial Neural Networks and Machine Learning !CANN 2012, Springer Berlin Heidelberg, Berlin, Heidelberg, pp. 121-128, XP047019226, ISBN: 978-3-642-33268-5 * p. 121-p. 128, paragraph 1 *.
Paulin MG Ed—Roy Asim et al: Neural 1-14 Engineering: Computation, Representation and Dynamics in Neurobiological Systems— Chris Eliasmith, Charles Anderson; MIT Press (Dec. 2003), ISBN: 0262050714, Neural Netwo, Elsevier Science Publishers, Barking, GB, vol. 17, No. 3, Apr. 1, 2004 (Apr. 1, 2004), pp. 461-463, XP004496862, ISSN: 0893-6080, DOI: 10.1016/J.NEUNET.2004. 01.002.

* cited by examiner

METHODS AND SYSTEMS FOR IMPLEMENTING DYNAMIC NEURAL NETWORKS

FIELD OF THE INVENTION

The invention relates generally to computing using single or multi-layer networks; and more particularly to a system and method for providing feed-forward, recurrent, and deep networks that process dynamic signals using temporal filters and static or time-varying nonlinearities.

BACKGROUND

The majority of artificial neural networks (ANNs) in use today are applied to static inputs (e.g., images). However, processing dynamic inputs (e.g., movies, sound, sensory feedback) is critical for real-time interaction with the world in domains such as manufacturing, auditory processing, video processing, and robotics. Non-ANN prior art methods for processing dynamic inputs occasionally rely on future information for processing a current state. This is sometimes called "acausal" filtering, and is typically physically implemented using delays (i.e. waiting until the future information is available before computing a response). Other state-of-the-art methods for processing dynamic inputs include nonlinear filtering, in which the output is not a linear function of the input. Both of these kinds of filtering are challenging for ANNs to realize. Currently, a dominant approach to processing temporal information in ANNs is to employ Long, Short-Term Memories (LSTMs; see S. Hochreiter and J. Schmidhuber, Long short-term memory. Neural Computation, vol. 9, no. 8, pp. 1735-1780, November 1997.). LSTMs rely solely on recurrent connections to process information over time with no synaptic filtering.

Another class of dynamic ANNs are those that employ "reservoir computing" (RC; see M. Lukoševičius and H. Jaeger, Reservoir computing approaches to recurrent neural network training. Computer Science Review, vol. 3, no. 3, pp. 127-149, August 2009.). Reservoir ANNs randomly connect large numbers of nonlinear nodes (i.e., neurons) recurrently, and then optimize (i.e., 'learn') a linear readout to perform dynamic signal processing. A neuron is said to be 'spiking' if its output consists of brief temporal pulses of output in response to its input. If the nodes in the reservoir are non-spiking (i.e., rate neurons), the method is called an Echo State Network (ESN; see H. Jaeger, The echo state approach to analysing and training recurrent neural networks. German National Research Center for Information Technology Technical Report, vol. 148, p. 34, January 2001.). LSTMs and the majority of other ANNs use rate neurons. There are a variety of methods for determining the connection weights between neurons in these networks, including gradient descent on the output connection weights, the First-Order Reduced and Controlled Error (FORCE; see D. Sussillo and L. F. Abbott, Generating coherent patterns of activity from chaotic neural networks. Neuron, vol. 63, no. 4, pp. 544-557, August 2009.) method on feedback connections, and unsupervised, error-driven Hebbian learning rules on the recurrent connections. Like LSTMs, ESNs and related methods rely solely on recurrent connections to process information over time. If the reservoir in an RC network uses spiking nodes, then the method is called a Liquid State Machine (LSM; see W. Maass, T. Natschläger, and H. Markram, Real-time computing without stable states: A new framework for neural computation based on perturbations. Neural Computation, vol. 14, no. 11, pp. 2531-2560, November 2002.). Liquid state machines are trained (i.e., optimized) in a similar manner to ESNs. Because of the spiking temporal representation, LSMs typically introduce a temporal filter (i.e., synapse) on the input to the nodes. This is most commonly a low-pass filter (i.e., decaying exponential), which smooths the spiking input before driving the neural non-linearity. LSMs usually use the same linear filter on all neurons, and they are usually first-order.

A different approach to building spiking and non-spiking dynamic neural networks is the Neural Engineering Framework (NEF; see C. Eliasmith and C. Anderson, Neural engineering: Computation, representation, and dynamics in neurobiological systems. MIT Press, 2003.). In this approach, the dynamics of the network are optimized to approximate a given function. This can be thought of as directly optimizing the "reservoir" in RC networks. The optimization can be done directly using a global optimizer, or during run-time using any of several learning rules. These networks usually assume a first-order low-pass temporal filter (i.e., synapse) as well.

Prior art approaches to implementing dynamic neural networks either do not have a synaptic filter (e.g., LSTMs, ESNs), or pick a simple filter (e.g., LSMs, NEF networks). These approaches also assume that the same filter is used for the majority of synapses in the model.

SUMMARY

In a first aspect, some embodiments of the invention provide a method for implementing single or multi-layer, feed-forward or recurrent neural networks for dynamic computations. The method includes defining any node response function that either exhibits brief temporal nonlinearities for representing state over time, often termed 'spikes', or exhibits a value at each time step or over continuous time (i.e., 'rates'). These response functions are dynamic because they accept input over time and produce output over time. For spiking neurons, the nonlinearity is over both time and state, whereas for rate neurons it is largely over state. The method also includes defining one or more temporal filters (i.e., synapses) on the input and/or output of each node. These synapses serve to filter the input/output signal in various ways, either linearly or non-linearly. This structure is then used to determine connection weights between layers of nodes for computing a specified dynamic function. Specification of the function can be performed either by writing it in closed form, or by providing sample points.

In some cases, the initial couplings and connection weights are determined using a neural compiler. Connection weights can be further trained either with online or offline optimization and learning methods.

In a second aspect, some embodiments of the invention provide a system for pattern classification, data representation, or signal processing in neural networks. The system includes one or more input layers presenting a vector of one or more dimensions, as well as zero or more intermediate layers coupled via weight matrices to at least one of the input, other intermediate, or output layers, and one or more output layers generating a vector representation of the data presented at the input layer or computing a function of that data. Each layer comprises a plurality of nonlinear components, wherein each nonlinear component has zero or more temporal filters on its input and zero or more temporal filters on its output, with one or more filters associated with each component, and the component coupled to the layer's input and output by at least one weighted coupling. The output from each nonlinear component's temporal filter is weighted by the connection weights of the corresponding weighted couplings and the weighted outputs are provided to the layer's output. The input to each nonlinear component's temporal filter is weighted by the connection weights of the corresponding weighted couplings and the weighted and filtered inputs are provided to the component. The connection weights are determined using methods of the first aspect.

In some cases, the input to the system is either discrete or continuous in time and/or space.

In some cases, the input to the system can be scalar or a multidimensional vector.

BRIEF DESCRIPTION OF THE DRAWINGS

A preferred embodiment of the present invention will now be specified in detail with reference to the drawings.

DESCRIPTION OF EXEMPLARY EMBODIMENTS

Figure 1:
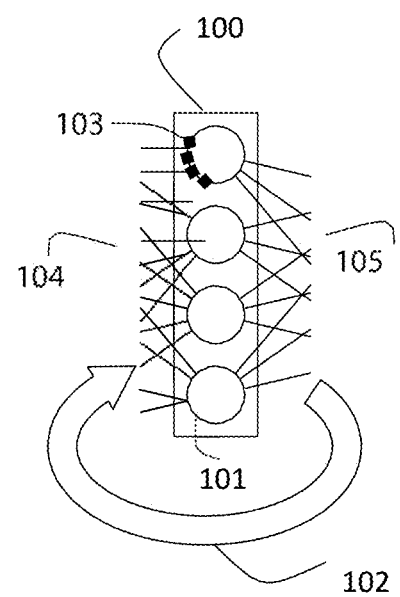
FIG. 1 is a block diagram of layers and nonlinear elements in accordance with an example embodiment.

Herein, specific details are set forth in order to provide a thorough understanding of the exemplary embodiments described. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high-level procedural or object-oriented programming or scripting language, or both, to communicate with a computer system. Alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer useable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

It should also be noted that, as used herein, the wording "and/or" is to mean inclusive-or. That is, "X and/or Y" is intended to mean X or Y or both, for example. As a further example, "X, Y, and/or Z" is intended to mean X or Y or Z or any combination thereof.

Embodiments described herein generally relate to a system and method for designing and implementing a feedforward or recurrent neural network for dynamic computation. Such a system can be efficiently implemented on a wide variety of distributed systems that include a large number of nonlinear components whose individual outputs can be combined together to implement certain aspects of the system as will be described more fully herein below.

Examples of nonlinear components that can be used in various embodiments described herein include simulated/artificial neurons, field-programmable gate arrays (FPGAs), graphics processing units (GPUs), configurations of analog components and other physical primitives including but not limited to transistors, and/or other parallel computing systems. Components of the system may also be implemented using a variety of standard techniques such as by using microcontrollers.

The systems described herein can be implemented in various forms including software simulations (using standard languages (e.g. Python, C, etc.) and more specialized implementations (e.g. Open Computing Language (OpenCL), Message Passing Interface (MPI), etc.), hardware, and/or any neuronal fabric. Examples of neuronal fabric mediums that can be used to implement the system designs described herein include Neurogrid (see S. Choudhary, S. Sloan, S. Fok, A. Neckar, Eric, Trautmann, P. Gao, T. Stewart, C. Eliasmith, and K. Boahen, Silicon neurons that compute, in International Conference on Artificial Neural Networks, pp. 121-128, 2012.), SpiNNaker (see M. Khan, D. Lester, L. Plana, A. Rast, X. Jin, E. Painkras, and S. Furber, SpiNNaker: Mapping neural networks onto a massively-parallel chip multiprocessor. IEEE, June 2008.), and TrueNorth (see P. A. Merolla, J. V. Arthur, R. Alvarez-Icaza, A. S. Cassidy, J. Sawada, F. Akopyan, B. L. Jackson, N. Imam, C. Guo, Y. Nakamura, B. Brezzo, I. Vo, S. K. Esser, R. Appuswamy, B. Taba, A. Amir, M. D. Flickner, W. P. Risk, R. Manohar, and D. S. Modha, Artificial brains. A million spiking-neuron integrated circuit with a scalable communication network and interface. Science, vol. 345, no. 6197, pp. 668-673, August 2014.). As used herein the term 'neuron' refers to spiking neurons, continuous rate neurons, and/or components of any arbitrary high-dimensional, non-linear, distributed system.

To generate such systems, the system dynamics can be characterized at a high level of description, using available background information regarding function. A low-level neural network structure can then be employed that includes a specific filter, or distribution of filters, on the inputs to the neurons in the network, and analytically relate the two. Subsequently, it is possible to optimize the connections between the elements in the neural network to accurately compute the desired function using standard optimization methods. The challenge this addresses is one of identifying and efficiently exploiting low-level dynamics and network structure at the functional level for dynamic information processing.

FIG. 1 shows the general architecture of a layer of these networks. Each layer (100) consists of several nodes (101) that can be either spiking or non-spiking. The overall network structure can be quite varied, with layers connecting within or back to themselves or to other layers earlier in the network (102; recurrent networks), or to layers later than them in the network. Networks that connect only in one direction are called feed-forward networks. Connections between layers may also be quite varied, including full connectivity, local connectivity, convolutional connectivity, or any other connectivity pattern known in the art. In addition, the networks considered introduce an explicit temporal filtering, some examples of which are denoted by black boxes (103), into the network. This filtering can take a variety of forms and be introduced in a variety of ways in each layer, including but not limited to same and/or different filters on inputs and/or outputs on each neuron, same and/or different filters on inputs and/or outputs on each dimension of the layer input/output vector (104, 105). Regardless of the topology, the overall network takes some form of vector input which it converts via its weighted, connected components to a different vector output, possibly changing the dimensionality. This figure represents the basic structure of the layers comprising the networks considered here.

Figure 2:
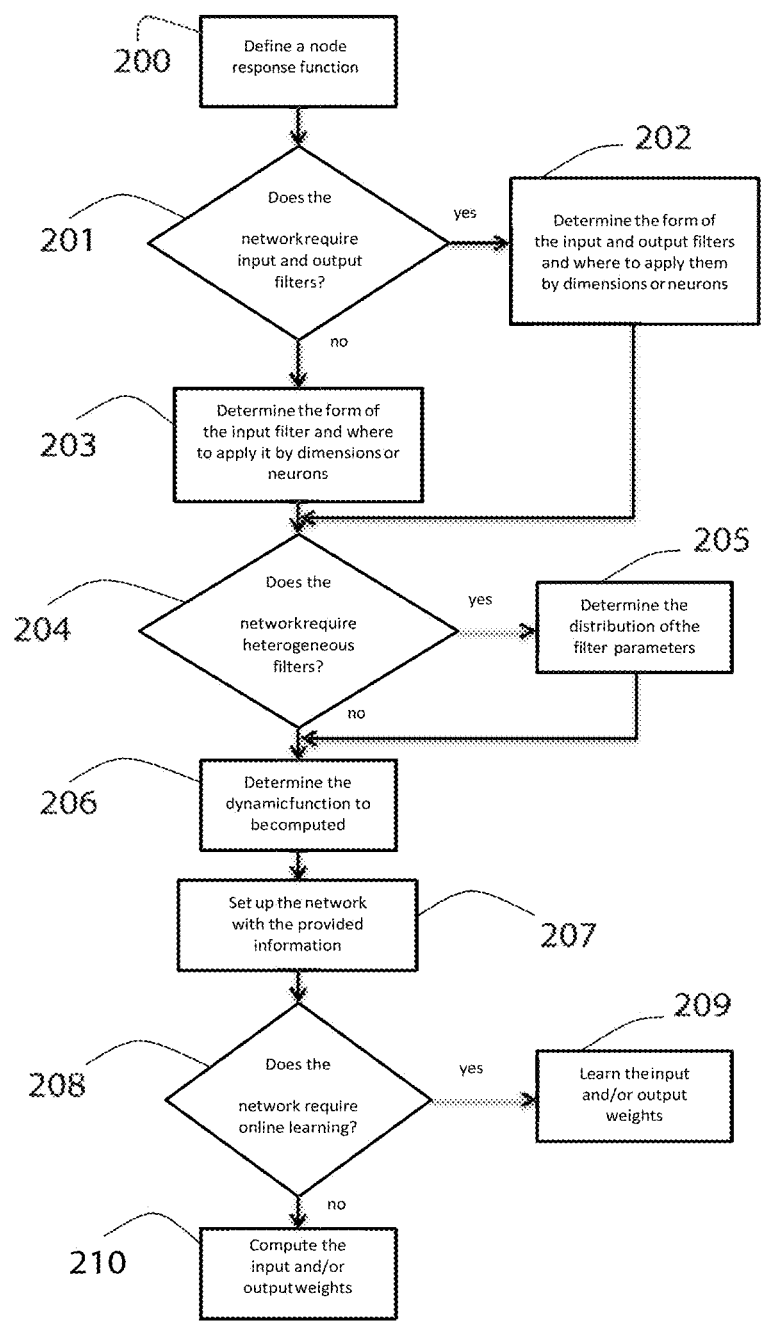
FIG. 2 is a diagram of the process involved in applying the method.

Referring now to FIG. 2, there is shown a method for implementing single or multi-layer, feed-forward or recurrent spiking neural network dynamic computations.

At step 200, the method defines any node response function that exhibits brief temporal nonlinearities for representing state over time, i.e., 'spikes' or node response functions that elicit values at each time, i.e., 'rates'. There are a wide variety of example spiking nonlinearities in the literature, including the Hodgkin-Huxley neuron, the Fitzhugh-Nagumo neuron, the exponential neuron, the quadratic neuron, the theta neuron, the integrate-and-fire neuron, the leaky integrate-and-fire neuron, the Wilson neuron, and the Izhikevich neuron, among others. Similarly, there are a wide variety of example rate nonlinearities, such as the family of sigmoidal curves, the tan h function, and/or the rectified linear neuron. Various hardware implementations of these and other nonlinearities have also been proposed for generating spike-like or rate-like outputs, any of which can be employed.

Steps 201-203 determine a plurality of input and/or output filters to be associated with the layer inputs. There are a wide variety of filters in the literature, many of which are considered models of synaptic response, including the exponential decay 'low-pass', the delayed low-pass, the alpha synapse, the double exponential synapse, and conductance-based models. These filters can be applied to each neuron input and/or output, or to each dimension of the input and/or output space being manipulated by the layer, and may be heterogeneous, as indicated at steps 204, 205.

At step 206, the method determines the dynamic function that is to be computed by the network. This function can be specified in closed form or defined with a set of example inputs and/or outputs.

Step 207 includes employing the chosen network structure to compute the specified dynamic function by finding the correct input and output weights. The novel approach proposed here for finding the weights is described in detail for several example embodiments below. Optimization for the weights can be accomplished in a number of ways at step 208, including by direction optimization (e.g., as sometimes used in the NEF), by optimization based on example simulations of the network as per step 210, or using any of a variety of standard "learning rules" or optimization methods specified in the literature as per step 209. The proposed network construction method shows how these optimization methods can be effectively used for networks with the structure specified. With this method the weights determined in step four can be used in a dynamically implemented spiking or rate neural network to compute the function trained for. This consists in running the dynamic neural model, where each neuron is connected to others by the input/output filters weighted by the connection weights determined during optimization. As shown in the example embodiments, this set of steps allows for good performance on a wide variety of difficult dynamic computations.

In this method the input/output filters can be discrete or continuous. Many software and hardware implementations use discrete time steps to simulate dynamical systems or perform computation overtime. As shown in the example embodiments, this method can account for discrete or continuous filtering. Accounting for discrete filtering can significantly improve the accuracy of discrete time step implementations.

In this method the optimization performed to determine the input/output weights can be performed either offline or online, determined in any of a number of ways. NEF methods fall into the former class, are very efficient and have strong convergence guarantees. In the example embodiments this is the most common method employed. However, some example embodiments use offline methods that require simulation of the network. Other work has shown how these same networks can be optimized using online methods as well (e.g., see T. Bekolay, Learning in large-scale spiking neural networks, Master's Thesis, University of Waterloo, September 2011.).

In this method the input/output weights can often be combined between layers to determine a single large connection weight matrix, as is more common in standard neural networks. This method can employ either factorized weights (i.e., separate input/output weights) or non-factorized weights (i.e., a single matrix). The optimization described can be performed on either factorized or non-factorized weights. Often factorized matrices are more computationally efficient to employ. The example embodiments use factorized matrices.

In this method the specified dynamic function can be continuously or discretely defined. Discretely defined functions are especially relevant for implementation of these methods in digital hardware and software.

In this method the specified dynamic function can be defined in a wide variety of ways. Most generally any linear or nonlinear differential equations in phase space can be specified. Identifying such systems can include, but is not limited to writing the equations in closed form, specifying a transfer function form, or providing a set of input/output point pairs. Similarly, any function specified as a pure delay or definable in terms of pure delays (e.g., a finite impulse response filters) can be employed. Subsequent example embodiments demonstrate a variety of these methods, including pure delays and a variety of functions defined in terms of pure delays, including differentiation and computing spectral power.

In this method the specified dynamic function can be a controllable pure delay or definable in terms of a controllable pure delay. A controllable pure delay is shown in an example embodiment. This is a nonlinear filter that allows the amount of delay to change as a function of its input. As with non-controlled delays and linear filters, controlled delays can be used to define an extremely wide variety of nonlinear temporal filters.

In this method Padé approximants can be used to implement the specified dynamic function, as can system identification methods. Padé approximants are a useful means of providing optimal approximations to filters defined over infinite states (like pure delays). An example embodiment demonstrates the use of this approximation for computing dynamic functions. Similarly, approximating complex dynamic functions can be performed by using numerical methods for system identification.

Example Embodiment: Acausal Filtering

Past work has not demonstrated a general approach to performing acausal filtering in such networks. An acausal filter is a dynamical system that requires information from future times to determine the value of the filtered signal at the current time. Acausal filtering is important for a wide variety of dynamic signal processing, including performing differentiation, highpass filtering, distortion reversal (and/or any other deconvolution), predicting future states of the system, among many others. Acausal filtering is closely related to prediction because it requires making estimates of future states. The methods described in this section address this problem for dynamic neural networks.

To perform acausal filtering, we need to know information that is not yet available to the system. Consequently, we wait for a period of time to gather sufficient information, and then compute the desired filter. To successfully pursue this approach, it is essential to be able to compute delayed versions of the input signal. Past work has not demonstrated how to construct such delays accurately and in general. We begin by addressing how to compute delays in dynamic neural networks.

Linear time-invariant (LTI) systems can be described by the state equations:

$$\dot{x}(t)=Ax(t)+Bu(t)$$

$$y(t)=Cx(t)+Du(t) \quad (1)$$

where the time-varying vector x represents the system state, y the output, u the input, and the time-invariant matrices (A, B, C, D) fully define the system dynamics. All causal finite-order LTI systems can be written in this form.

Accurate Delays

In many scenarios, the transfer function is a more useful representation of the LTI system. The transfer function is defined as $$\frac{Y_{(s)}}{U_{(s)}},$$

where Y(s) and U(s) are the Laplace transforms of output y(t) and input u(t) respectively. The variable s denotes a complex variable in the frequency domain, while t is a non-negative real variable in the time domain. The transfer function is related to the state-space representation (1) by the following equation:

$$F(s) = \frac{Y_{(s)}}{U_{(s)}} = C(sI - A)^{-1}B + D. \quad (2)$$

The transfer function for a pure delay of α seconds is:

$$F(s)=e^{-\alpha s}. \quad (3)$$

A transfer function can be converted into state-space representation using (2) if and only if it can be written as a proper ratio of finite polynomials in s. The ratio is proper when the degree of the numerator does not exceed that of the denominator. In this case, the output will not depend on future input, and so the system is causal. The order of the denominator corresponds to the dimensionality of x, and therefore must be finite. Both of these conditions can be interpreted as physically realistic constraints where time may only progress forward, and neural resources are finite.

To approximate the irrational transfer function (3) as a ratio of finite polynomials, we use the Padé approximants of the exponential, $$[p/q]e^{-\alpha s} = \frac{Q_p(-\alpha s)}{Q_q(\alpha s)} \quad (4)$$

$$Q_k(s) = \sum_{i=0}^{k} \binom{k}{i}\frac{(p+q-i)!}{(p+q)!}s^i. \quad (5)$$

This gives the optimal approximation for a transfer function with order p in the numerator and order q in the denominator. After choosing suitable values for p≤q, we can numerically find a state-space representation (A, B, C, D) that satisfies (2) using standard methods.

For the common case that p=q−1, we may bypass the need for any numerical methods by analytically finding a simple state-space representation. Consider the Padé approximants of (3) in the case where q−1 and q are the order of the numerator and denominator, respectively. We rewrite (4) by expanding (5) to get:

$$[q-1/q]e^{-\alpha s} = \frac{\sum_{i=0}^{q-1}\binom{q-1}{i}(2q-1-i)!(-1)^i\alpha^i s^i}{\sum_{i=0}^{q}\binom{q}{i}(2q-1-i)!\alpha^i s^i}$$

$$= \frac{\frac{1}{\alpha^q(q-1)}\sum_{i=0}^{q-1}\frac{(q-1)!}{(q-1-i)!i!}(2q-1-i)!\alpha^i s^i(-1)^i}{s^q + \frac{1}{\alpha^q(q-1)!}\sum_{i=0}^{q-1}\frac{q!}{(q-i)!i!}(2q-1-i)!\alpha^i s^i}$$

$$= \frac{\sum_{i=0}^{q-1}c_i s^i}{s^q + \sum_{i=0}^{q-1}d_i s^i},$$

where $$d_i = \frac{q(2q-1-i)!}{(q-i)!i!}\alpha^{i-q} \text{ and } c_i = d_i(-1)\frac{i(q-i)}{q}.$$

This transfer function is readily converted into a state-space representation in controllable canonical form:

$$A = \begin{pmatrix} -d_{q-1} & -d_{q-2} & \cdots & -d_0 \\ 1 & 0 & \cdots & 0 \\ 0 & \ddots & \ddots & \vdots \\ \vdots & 0 & 1 & 0 \end{pmatrix}$$

$$B = (1 \ 0 \ \cdots \ 0)^T$$

$$C = (c_{q-1} \ c_{q-2} \ \cdots \ c_0)$$

$$D = 0.$$

However, the factorials in $d_i$ and $c_i$ may introduce numerical issues. To simplify implementation we scale the $i^{th}$ dimension of x by $-d_{q-i}$. This is achieved without changing the transfer function by multiplying the $j^{th}$ entry in B by $-d_{q-j}$, the $i^{th}$ entry in C by $-1/d_{q-i}$, and the $(i, j)^{th}$ entry in A by $d_{q-i}/d_{q-j}$, to obtain the equivalent state-space representation, $$A = \begin{pmatrix} -v_0 & -v_0 & \cdots & -v_0 \\ v_1 & 0 & \cdots & 0 \\ 0 & \ddots & \ddots & \vdots \\ \vdots & 0 & v_{q-1} & 0 \end{pmatrix} \quad (6)$$

$$B = (-v_0 \ 0 \ \cdots \ 0)^T$$

$$C = (\omega_0 \ \omega_1 \ \cdots \ \omega_{q-1})$$

$$D = 0,$$

where $$v_i = \frac{(q+i)(q-i)}{(i+1)\alpha} \text{ and } \omega_i = (-1)^{q-i}\frac{(i+1)}{q},$$

for i=0 ... q−1. This follows from noting that $v_0 = d_{q-1}$ and $v_i = d_{q-i-1}/d_{q-1}$ for i≥1. This provides an exact solution for the Padé approximation of the delay.

Figure 3:
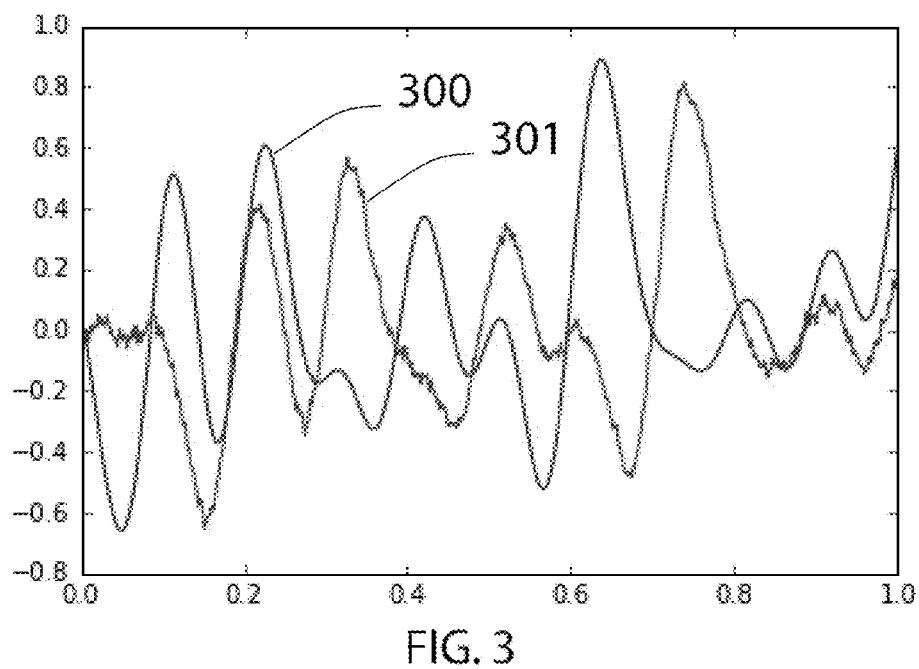
FIG. 3 shows an embodiment computing a 100 ms delay with spiking neurons.

With this description we can use the NEF methods to generate an example embodiment. FIG. 3 shows the results of performing a 100 ms delay on a random 10 Hz white noise signal with 400 spiking neurons using a first-order low-pass synaptic filter with a time constant of 5 ms. It is using a 4th-order approximation. The original input signal (300) is delayed and decoded (301) from the neural spikes generated by the recurrently connected neurons.

Figure 4:
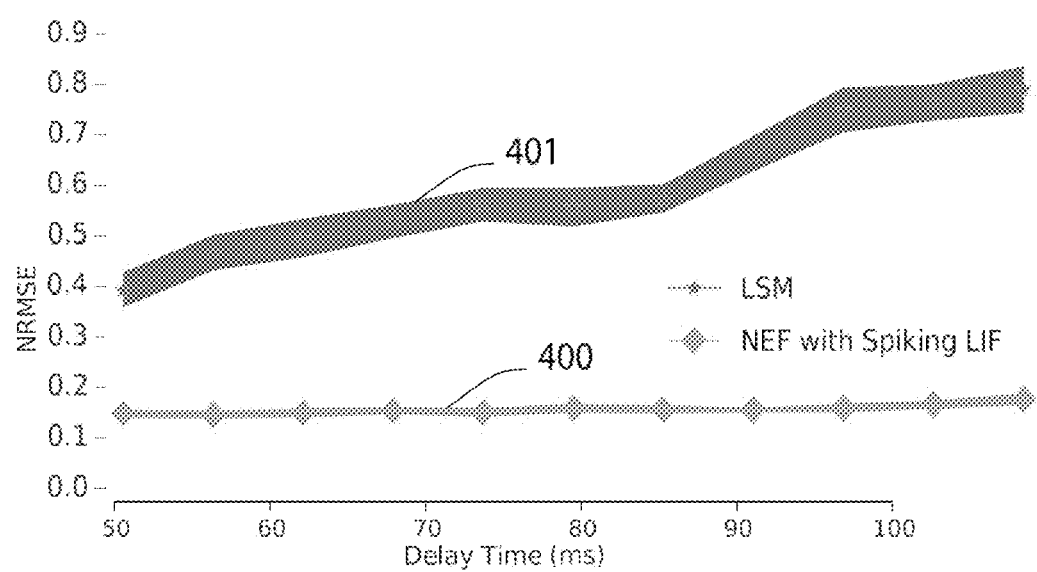
FIG. 4 shows improved accuracy of these methods over state-of-the-art methods.
Figure 5:
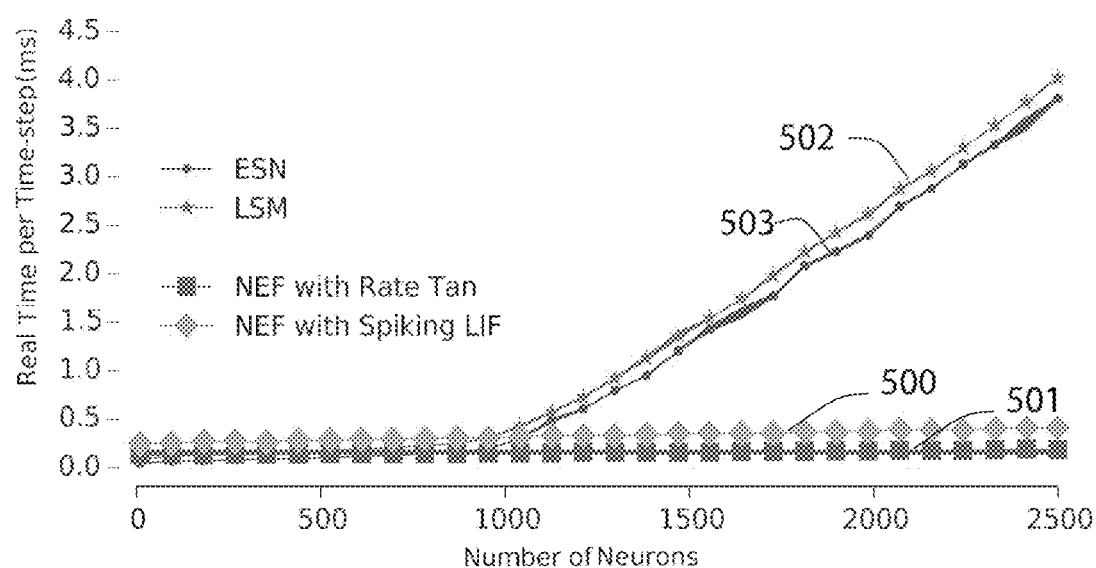
FIG. 5 shows improved computational costs compared to state-of-the-art methods.

Furthermore, these methods are significantly more accurate and far less computationally expensive than other state-of-the-art methods. Specifically, FIG. 4 demonstrates that in a network of 500 neurons computing delays from 50-100 ms on 8 Hz white noise, the NEF methods (400) are 4× or more accurate than a liquid state machine (LSM), which is the spiking implementation of reservoir computing (401). Rate mode versions of NEF compared to an echo state network (ESN), which is the non-spiking implementation of reservoir computing, have the same accuracy. However, as shown in FIG. 5 spiking and rate NEF networks are a factor O(N) cheaper to compute (500, 501), with N as the number of neurons, because of their factored weight matrices compared to reservoir methods (502,503).

Figure 6:
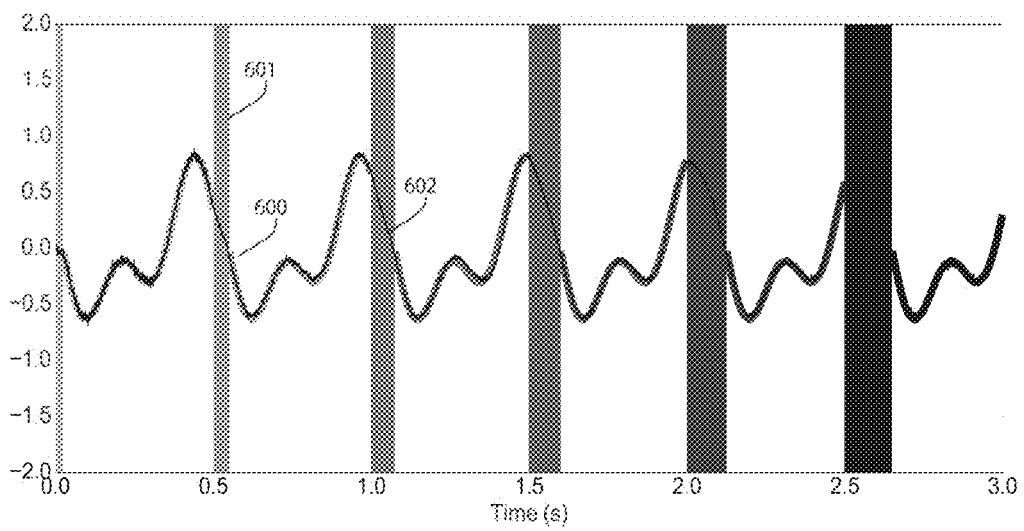
FIG. 6 shows an embodiment computing the acausal derivative filter.

Another embodiment of the delay network allows us to introduce controlled delay into the network by noting that in (6) all terms in the feedback A matrix are a function of a. Consequently, we can introduce an input that provides a on-the-fly, controlling the delay online. This input is encoded into the state-space x and the product is computed in the recurrent connection. FIG. 6 is the same as the previous embodiment, but with 2000 spiking neurons and a controllable input. The original input signal (600) is delayed by an amount controlled by the delay input (601) which changes from 25 ms to 150 ms in steps of 25 ms in this figure (delay length is indicated by the shaded bars). The delayed signal (602) is decoded from the neural spiking activity.

Acausal Filtering Examples

Figure 7:
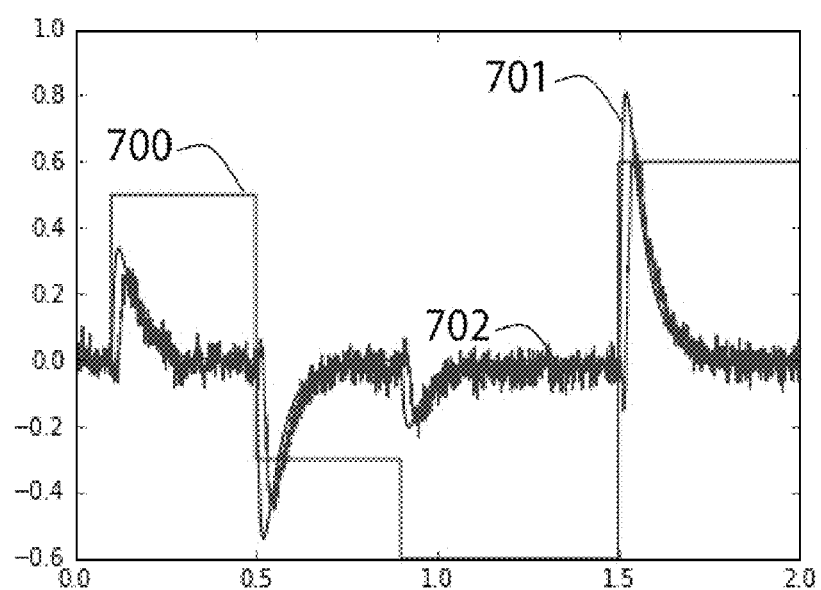
FIG. 7 shows an embodiment with a controllable delay.

An accurate method for generating a delayed version of a signal provides the basis for general acausal filtering. One embodiment of an acausal filtering network is the network that computes the derivative of the input signal. FIG. 7 shows the behaviour of a 400 neuron network that implements the acausal differentiation transfer function F(s)=τs using a delay of 15 ms. The input signal (700) and the ideal derivative filter (701) are shown along with the decoded output (702) of the spiking recurrent neural network computation of that filter using a delay. Since the output is spikes, we filter it with a low-pass filter. The end result is therefore the highpass filter, $$F(s) = \frac{\tau s}{\tau s + 1},$$

which smooths out the derivative. In this example τ=50 ms.

This embodiment network is one example of a general (acausal) deconvolution network with the specific transfer function $$F(s) = \frac{1}{\tau s}.$$

Deconvolution can be instantiated with any LTI that one wishes to invert, provided the delayed inverse can be accurately approximated.

To perform more complex acausal filtering, we need to generate many delayed versions of the input signal. It is known that any finite impulse response filter can be approximated by a weighted sum of delays. Consequently, another embodiment consists of creating many different delays in a network and weighting those to compute the filter. Such a delay bank is very flexible for computing a wide variety of dynamic functions using neural networks. Determining the output weights on the filter bank can be done using a wide variety of methods that employ either online or offline learning or optimization. More generally, such a filter bank allows for nonlinear combinations of delays and represented states.

Figure 8:
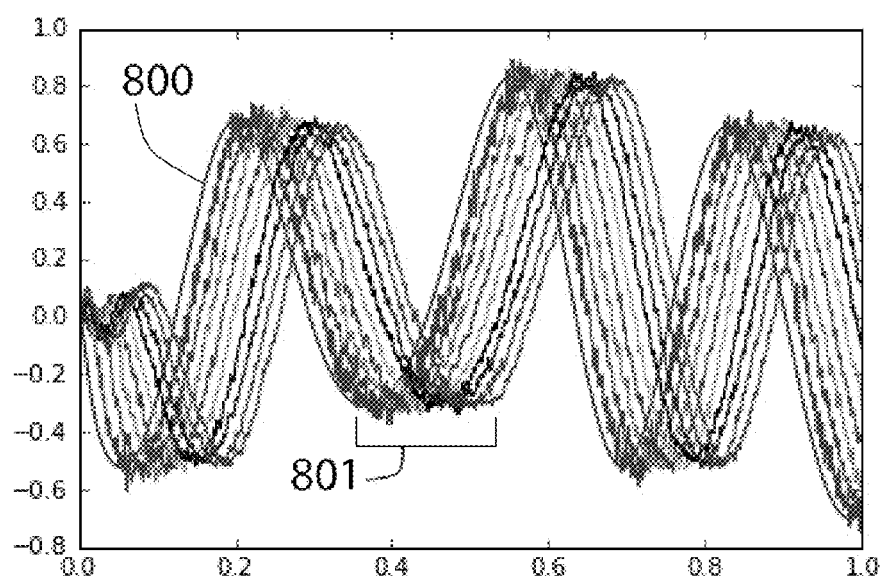
FIG. 8 shows an embodiment computing ten different delays within one network.

FIG. 8 shows the output of a network instantiating a bank of delays separated by 15 ms each. The input signal (800) is a 10 Hz white noise signal and the output includes 9 delayed versions of that signal (801), computed with 5400 spiking neurons using 3rd-order delay approximations.

Figure 9:
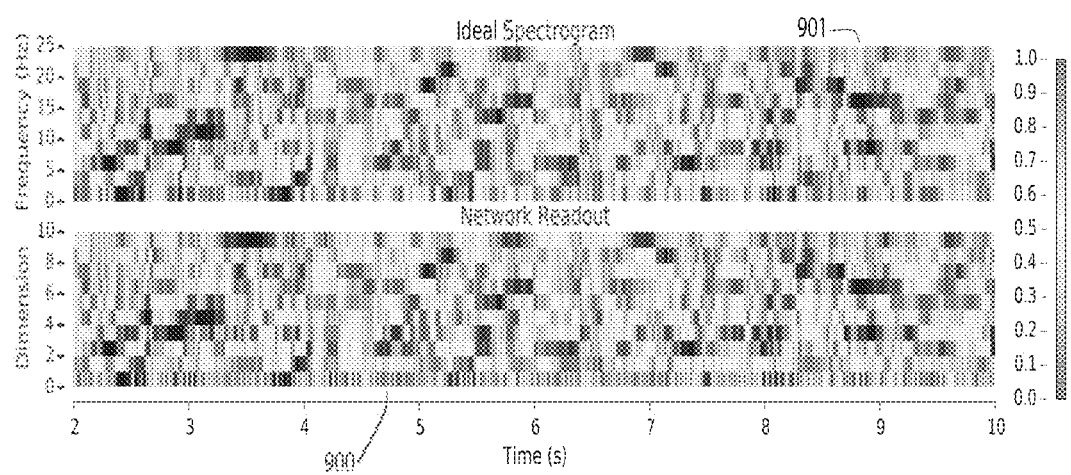
FIG. 9 shows results of computing the Fourier transform power, a nonlinear dynamic computation.

An example embodiment that employs a filter bank and is performing nonlinear filtering is demonstrated in FIG. 9. This network is computing the power of the Fourier transform at 10 frequencies (900) which is compared to the ideal computation (901). The input signal is random 25 Hz white noise, and the network employs 22800 rate neurons with 20 delays spaced by 20 ms where p=q=40.

Figure 10:
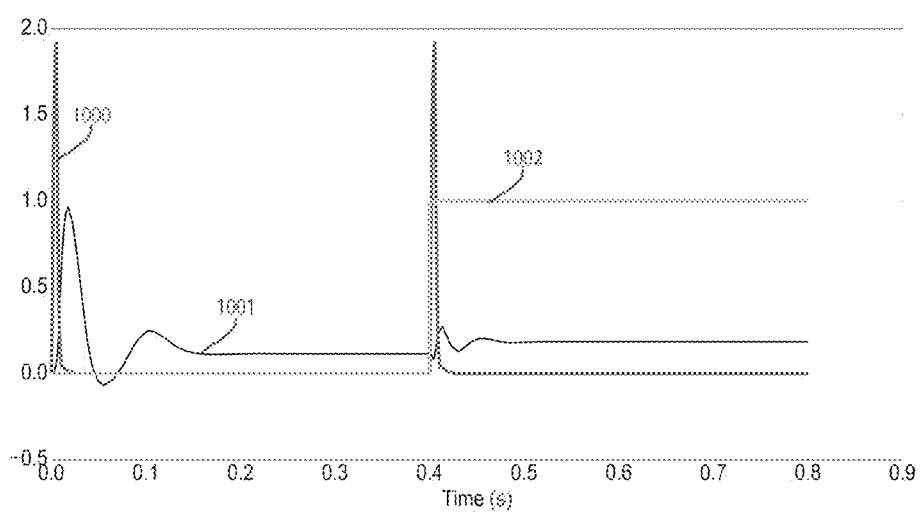
FIG. 10 shows trajectory generation using a controllable delay bank.

The next embodiment we consider uses controlled delay and an arbitrary filter to perform trajectory generation is shown in FIG. 10. In this case, the input is a delta function and the output is an arbitrary trajectory over time, defined by the shape of the filter. The input (1000) causes the system to play back the trajectory (1001) using the delay bank. The speed and size of playback can be controlled by the delay input (1002) as shown. This example shows the same trajectory played 'big' and 'small' given the same delta function input, but for a different delay control input.

Example Embodiment: Arbitrary Synaptic Filters

Method 1: Using Taylor Series Approximations

Past work has not shown how to account for arbitrary synaptic filters in the implemented neural network. The NEF has demonstrated how to account for the special case of a first-order low-pass filter. The methods described in this section address the general problem. Some of these modifications improve network accuracy and reduce the number of network elements needed to perform a given computation effectively. These modifications also allow the efficient use of a wider variety of discrete and continuous synaptic filters.

Figure 11:
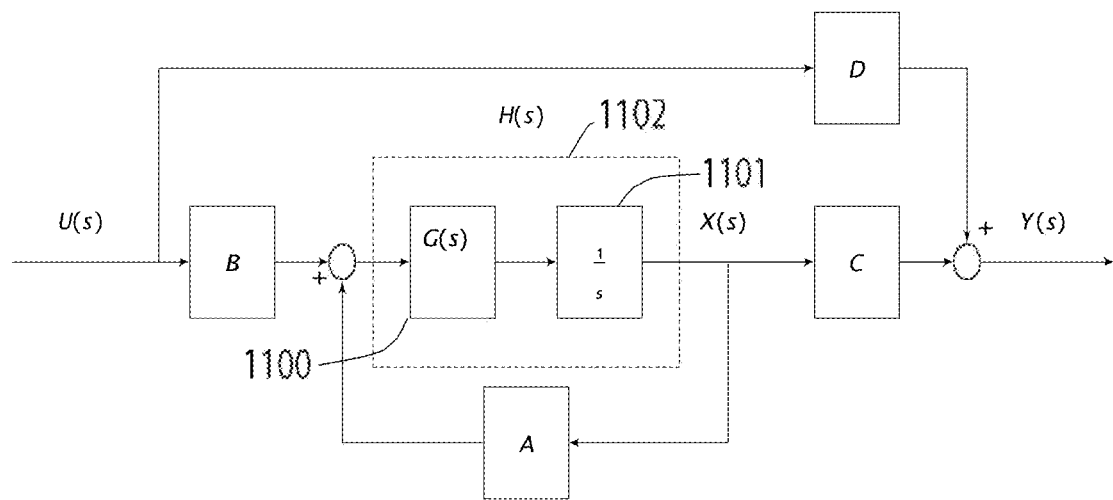
FIG. 11 is a diagram of an abstract characterization of the system with an arbitrary synaptic filter.

Referring to FIG. 11 we consider appending some arbitrary transfer function G(s) (1100) to the feedback, so as to replace the integrator $$\frac{1}{s}(1101)$$

with $$H(s) = G(s)\frac{1}{s}(1102).$$

This system has transfer function $$C\left(\frac{s}{G(s)}I - A\right)^{-1}B + D = F\left(\frac{s}{G(s)}\right) = F\left(\frac{1}{H(s)}\right),$$

where $F(s)=C(sI-A)^{-1}B+D$ is the transfer function for (A, B, C, D).

To invert the change in dynamics introduced by appending G(s), we must compensate for the change of variables $$\frac{s}{G(s)}$$

in the complex frequency domain. This involves finding the required F'(s) such that $$F'\left(\frac{1}{H(s)}\right)$$

is equal to the desired transfer function, F(s). Then the state-space representation of F'(s) provides (A', B', C', D') which implement the desired dynamics.

For example, if we replace the integrator with a low-pass filter, so that $$h(t) = \frac{1}{\tau}e^{-\frac{t}{\tau}},$$

and set G(s) to unity then:

$$F'(s)=C(sI-(\tau A+I))^{-1}(\tau B)+D=C'(sI-\tau A')^{-1}B'+D',$$

which is an alternative derivation of the mapping given by NEF methods. However, this is the only form of H(s) solved for by the NEF. We extend this result to apply to a wider variety of filters. For instance, in the case of the alpha synapse model where $$H(s) = \frac{1}{(1+\tau s)^2}$$

we can show that:

$$F'(s)=C(\sqrt{s}I-(\tau A+I))^{-1}(\tau B)+D.$$

Notably, this embodiment is nonlinear in s. We can use the Taylor series expansion $$\sqrt{s} = 1 + \frac{1}{2}(s-1) + o(s)$$

to linearize √s in our characterization of F'(s), giving $$F'(s)=C(sI-(2\tau A+I))^{-1}(2\tau B)+D.$$

Another example embodiment is the case of a discrete low-pass filter with a z-transform of $$H(z) = \frac{1-a}{z-a}, a = e^{-\frac{dt}{\tau}},$$

$$F'\left(\frac{z-a}{1-a}\right) = F(z) \quad (7)$$

$$\Leftrightarrow F'(z) = F(z(1-a)+a)$$
$$= \overline{C}((z(1-a)+a)(I-\overline{A})^{-1}\overline{B} + \overline{D}$$
$$= \overline{C}\left(zI - \frac{1}{1-a}(\overline{A}-aI)\right)^{-1}\left(\frac{1}{1-a}\overline{B}\right) + \overline{D}$$

$$\Rightarrow (\overline{A}', \overline{B}', \overline{C}', \overline{D}') = \left(\frac{1}{1-a}(\overline{A}-aI), \frac{1}{1-a}\overline{B}, \overline{C}, \overline{D}\right),$$

where $(\overline{A}, \overline{B}, \overline{C}, \overline{D})$ is the result of discretizing $(A, B, C, D)$ with time step dt. Discrete filters are particularly relevant for hardware implementations which are clocked at a specific frequency, and hence have a built in dt, or software implementations that use a time step to approximate continuous dynamics. This embodiment can make such implementations more accurate.

A further example embodiment is one which compensates for a continuous feedback delay of β seconds, by setting $G(s)=e^{-\beta s}$, then $$F'\left(\frac{s}{e^{-\beta s}}\right) = F(s) \Leftrightarrow F'(s) = F\left(\frac{1}{\beta}W_0(\beta s)\right) \quad (8)$$

where $W_0(xe^x)=x$ is the principle branch of the Lambert-W function, since $$F'(se^{\beta s}) = F\left(\frac{1}{\beta}W_0(\beta s e^{\beta s})\right) = F(s).$$

In this case, since $W_0$ is nonlinear in s, the effect of the change of variables on the required state-space representation will depend on the desired transfer function F.

For this embodiment we consider the case of a synapse modeled by a low-pass filter with a pure delay of β seconds, to account for possible transmission time delays along presynaptic axons. In this instance, $$H(s) = \frac{e^{-\beta s}}{\tau s + 1}, \text{ and let } d = \frac{\beta}{\tau}e^{\frac{\beta}{\tau}}.$$

We can then show $$F'\left(\frac{\tau s + 1}{e^{-\beta s}}\right) = F(s) \quad (9)$$

$$\Leftrightarrow F'\left(\beta s + \frac{\beta}{\tau}\right)e^{(\beta s + \frac{\beta}{\tau})} = F\left(\frac{\beta}{\tau}e^{\frac{\beta}{\tau}}s\right)$$

$$\Leftrightarrow F'\left(\beta s + \frac{\beta}{\tau}\right) = F(W_0(ds))$$

$$\Leftrightarrow F'(s) = F\left(\frac{1}{\beta}W_0(ds) - \frac{1}{\tau}\right).$$

So in the pure delay case when $F(s)=e^{-\alpha s}$ is the desired transfer function, let so that $$c = e^{\frac{\alpha}{\tau}} \text{ and } r = \frac{\alpha}{\beta},$$

$$F'(s)e^{-\alpha\left(\frac{1}{\beta}W_0(ds) - \frac{1}{\tau}\right)} = ce^{-rW_0(ds)} = c\left(\frac{W_0(ds)}{ds}\right)^r \quad (10)$$

is the required transfer function. Then we can numerically find the Padé approximants by using the Taylor series of (10).

$$F'(s) = c\sum_{i=0}^{\infty} \frac{r(i+r)^{i-1}}{i!}(-ds)^i \quad (11)$$

Figure 12:
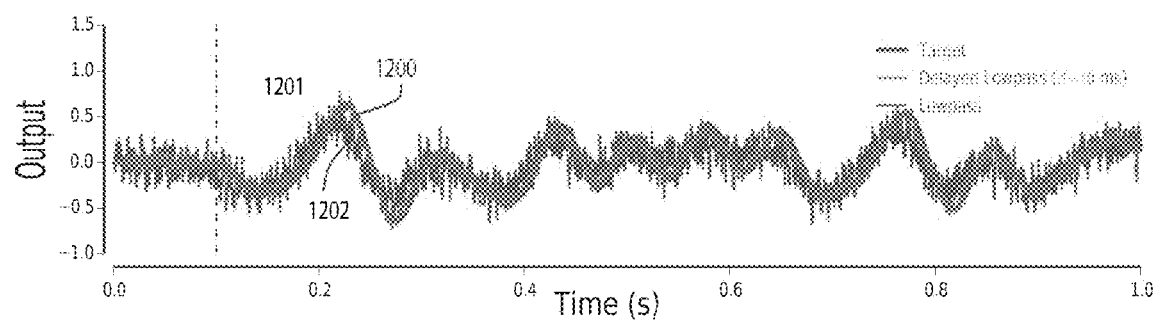
FIG. 12 shows improved accuracy in delay computation by including higher-order synapses.

As shown in FIG. 12 an instance of this embodiment can be used to provide a better approximation of an ideal delay (1200) if the synapses themselves include a delay (1201), than the previous embodiment that only assumed a first-order linear filter (1202). Because the synapses include a 10 ms delay, this result demonstrates that these methods can be used to amplify the low-level synaptic delay 10-fold, while resulting in an improvement of 3× on normalized root-mean-square error (NRMSE).

Method 2: Direct Solution

Consider the Laplace transform of some k-order synapse:

$$H(s) = \frac{1}{\sum_{i=0}^{k} c_i s^i}$$

We wish to implement the desired nonlinear dynamical system:

$$\dot{x}=f(x,u)$$

using this synaptic filter. Letting $w(t)=f'(x, u)$ and observing that in the actual system $x(t)=(w*h)(t)$, we can write these dynamics in the Laplace domain:

$$\frac{X(s)}{W(s)} = \frac{1}{\sum_{i=0}^{k} c_i s^i}$$

$$\Leftrightarrow W(s) = X(s)\sum_{i=0}^{k} c_i s^i = \sum_{i=0}^{k} c_i [X(s)s^i]$$

since s is the differential operator. So the required function $f'(x, u)$ for the recurrent connection, for any synapse, is:

$$f'(x,u)=\sum_{i=0}^{k} c_i x^{(i)}, \quad (12)$$

where $x^{(i)}$ denotes the $i^{th}$ derivative of $x(t)$.

In the discrete case $x[t+1]=f(x, u)$:

$$f'(x,u)=\sum_{i=0}^{k} c_i x[t+i]. \quad (13)$$

The proof for the discrete case is similar by use of the time-shift operator with the z-transform.

For the generalized alpha synapse (i.e., double exponential), we find $$H(s) = \frac{1}{(\tau_1 s + 1)(\tau_2 s + 1)} = \frac{1}{\tau_1 \tau_2 s^2 + (\tau_1 + \tau_2)s + 1} \quad (14)$$

$$\Rightarrow f'(x, u) = x + (\tau_1 + \tau_2)\dot{x} + \tau_1 \tau_2 \ddot{x}$$

$$= x + (\tau_1 + \tau_2)f(x, u) + \tau_1 \tau_2 \left( \frac{\partial f(x, u)}{\partial x} f(x, u) + \frac{\partial f(x, u)}{\partial u} \dot{u} \right).$$

This approach requires us to differentiate the desired system. If we are dealing with linear systems, then we can do this analytically to obtain a closed-form expression.

By induction it can be shown that:

$$x^{(i)} = A^i x + \Sigma_{j=0}^{i-1} A^{i-j-1} B u^{(j)}.$$

Then by expanding and rewriting the summations:

$$f'(x, u) = \sum_{i=0}^{k} c_i x^{(i)} \quad (15)$$

$$= \sum_{i=0}^{k} c_i \left[ A^i x + \sum_{j=0}^{i-1} A^{i-j-1} B u^{(j)} \right]$$

$$= \underbrace{\left( \sum_{i=0}^{k} c_i A^i \right)}_{\text{Recurrent Matrix}} x + \sum_{j=0}^{k-1} \underbrace{\left( \sum_{i=j+1}^{k} c_i A^{i-j-1} \right)}_{\text{Input Matrices}} B u^{(j)}.$$

This gives a matrix form for any LTI system with a k-order synapse, provided we can determine each $u^{(j)}$ for $0 \leq j \leq k-1$.

As a demonstration, we can apply the above formula to the generalized alpha synapse, giving the following expression for any linear system:

$$f'(x,u) = (\tau_1 \tau_2 A^2 + (\tau_1 + \tau_2)A + I)x + (\tau_1 + \tau_2 \tau_1 \tau_2 A)Bu + \tau_1 \tau_2 B\dot{u}.$$

Example Embodiment: Synaptic Heterogeneity

Past work has not shown how to take advantage of having a variety of different synaptic filters within the implemented network. The methods described in this section address this general problem. Some of these modifications improve network accuracy for performing dynamic computation.

Figure 13:
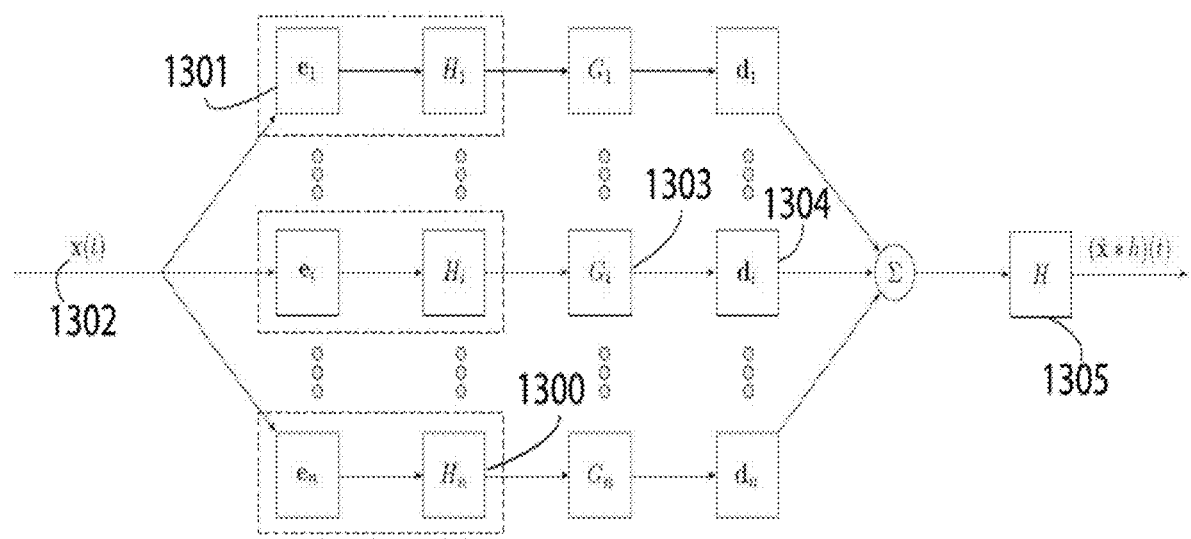
FIG. 13 is a diagram of an abstract decomposition of the system into encoding and decoding filters.

Introducing heterogeneous filters into the NEF significantly extends these methods. As shown in FIG. 13 we can introduce an "encoding filter" $H_i$ (1300) after the standard NEF encoder $e_i$ (1301) that is distinct for each neuron and provides a specific processing of the time-varying vector x(t) (1302). The filter signal projects through the neural nonlinearity $G_i$ (1303) resulting in neural activity that is decoded with linear decoders $d_i$ (1304) and filtered by a standard NEF filter H (1305). In essence we have factorized the dynamics into encoding and decoding filters in a manner analogous to the factorization of the weight matrix into decoders and encoders in the NEF.

In the NEF, there is a single synaptic filter per projection between ensembles, resulting in the encoding given by:

$$\delta_i = G_i[<e_i h(t)*x(t)> + J_i].$$

where $\delta_i$ is the neural activity (rates or spikes) from neuron i, and $J_i$ is a bias current. Here we have introduced the notion of defining one or more synaptic filter per neuron, as is shown in FIG. 13, giving:

$$\delta_i = G_i[h_i(t)*<e_i x(t)> + J_i],$$

or per dimension in the input space $$\delta_i = G_i[<e_i h_i(t)*x(t)> + J_i],$$

where $h_i(t)$ is a vector of D filters applied to their respective dimensions in the D-dimensional input vector x(t). This provides a wider variety of "temporal features" that are encoded by the neural population, allowing us to extend the NEF in a manner that provides better implementation of a broad class of dynamical computation.

Figure 14:
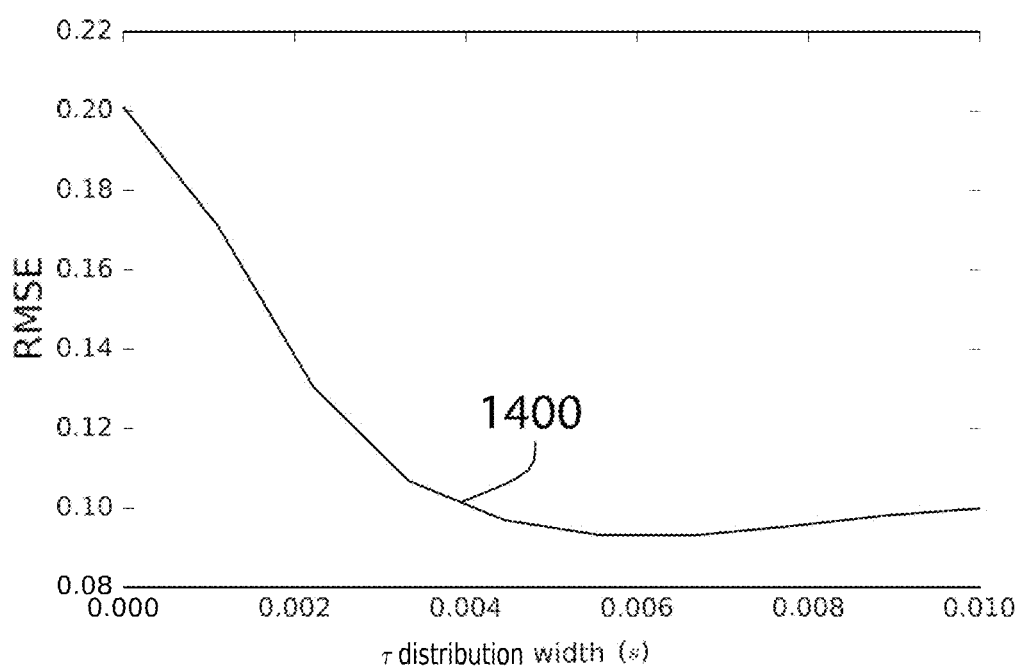
FIG. 14 shows the ability to determine the optimal distribution of heterogeneous synapses to minimize error in computing a derivative.

In our example embodiment, we use heterogeneous first-order linear filters, but the methods apply to any linear filters. Here, we employ these methods to compute the differentiation operator. Specifically, we approximate the filter $H(s) = 2\tau s/(\tau s + 1)$. This is the derivative s multiplied by a low-pass $1/(\tau s + 1)$ (to make it causal) and scaled by $2\tau$ for normalization. We simulate a network of 1000 spiking neurons with 15 Hz white noise input, and vary the width of the distribution for the time constants of the input filters for each neuron. The time constants are picked from an even distribution with a lower bound of 0.2 ms and an upper bound that varies up to 10 ms. FIG. 14 shows the results of these simulations, that demonstrate the importance of having a variety of time constants. Root mean-square-error (RMSE) is shown as a function of the change in distribution width (1400). In this instance, the optimal width is approximately 6 ms. Notably, the RMSE drops in half at the optimal value. Because there exists an optimal value, it is clear that the distribution is playing an important role (i.e., it is not merely because longer synapses are being introduced). Thus this extension to the NEF improves the ability of these networks to compute dynamical functions.

DISCUSSION

The embodiments demonstrated here show the ability to compute a variety of linear and nonlinear dynamic functions, accurate casual and acausal filters. Examples include specific applications to delays, discrete implementation, spectrographic power, derivatives, and Fourier transforms. Additional embodiments extend these results by showing how to employ a wide variety of synaptic filters, and how to exploit heterogeneous distributions of synaptic filters.

The example results shown demonstrate that the methods described in this invention allow us to improve RMSE and computation time compared to state-of-the-art approaches, and also show the applicability of these methods to a wide variety of neural networks, both spiking and non-spiking, for performing dynamical computation.

The methods described here can be used to develop additional embodiments not described in detail. These include exploitation of intrinsic neuron dynamics, such as using intrinsically bursting neurons to more efficiently implement oscillatory networks, or adapting neurons to more efficiently and accurately compute differentiation. Similarly, these methods can support dynamic processing, such as prediction (which reduces to differentiation for a wide variety of cases, e.g., as is evident from the Taylor series expansion of functions). Some of the examples provided can be directly combined, such as using a controlled delay bank of filters for trajectory generation to produce useful networks. As well, the employment of nonlinear synaptic filters and nonlinear mixing of delays can be accomplished through direct applications of these methods.

The invention claimed is:

1. A computer implemented method for implementing an artificial neural network for dynamic computing applications on a given computing system, the artificial neural network comprising a plurality of nodes, each node having an input and an output, the method comprising:
   specifying a desired dynamic function $f$ to be computed;
   defining at least one node response function for the plurality of nodes, wherein the at least one node response function is defined to receive varying inputs over time at each node input and produce varying outputs over time at each node output;
   associating a plurality of temporal filters with the plurality of nodes, wherein at least one particular temporal filter of the plurality of temporal filters is associated with each node in the plurality of nodes;
   determining a system-specific synaptic filter H of the given computing system, wherein the system-specific synaptic filter H is one of a discrete time filter and a continuous time filter;
   determining a mapping function corresponding to the system-specific synaptic filter H, wherein the mapping function is selected from a plurality of potential mapping functions, wherein the plurality of potential mapping functions include a first set of mapping functions usable to account for discrete time synaptic filters and a second set of mapping functions usable to account for continuous time synaptic filters;
   determining a modified dynamic function $f'$ based on the desired dynamic function $f$ using the selected mapping function, wherein the modified dynamic function $f'$ is determined to account for the system-specific synaptic filter H;
   using the at least one node response function and the plurality of temporal filters to determine connection weights between the plurality of nodes in the artificial neural network to match the modified dynamic function $f'$, wherein each connection weight is coupled to at least one of a corresponding node input or a corresponding node output and each connection weight is configured to be multiplied by at least one of the input received by the corresponding node input or the output produced by the corresponding node output; and
   operating the artificial neural network on the given computing system using the determined connection weights to compute the desired dynamic function $f$.

2. The method of claim 1, wherein the system-specific synaptic filter H is the discrete time filter and the modified dynamic function $f'$ is determined according to:

$$f'(x,u) = \Sigma_{i=0}^{k} \bar{c}_i x[t+i]$$

where $\bar{c}_i$ are coefficients of the filter, x represents a system state, and u represents a system input.

3. The method of claim 1, wherein the system-specific synaptic filter H is the continuous time filter and the modified dynamic function $f'$ is determined according to:

$$f'(x,u) = \Sigma_{i=0}^{k} c_i x^{(i)}$$

where $c_i$ are coefficients of the filter, x represents a system state, u represents a system input, and $x^{(i)}$ denotes the $i^{th}$ derivative of x(t).

4. The method of claim 1, wherein the system-specific synaptic filter H is the discrete time filter and the modified dynamic function $f'$ is determined according to:

$$F'\left(\frac{1}{H}\right) = F$$

where $\bar{F}$ is the z-Transform of the desired dynamic function $f$ and F' is the z-Transform of the modified dynamic function $f'$.

5. The method of claim 1, wherein the system-specific synaptic filter H is the continuous time filter and the modified dynamic function $f'$ is determined according to:

$$F'\left(\frac{1}{H}\right) = F$$

where F is the Laplace Transform of the desired dynamic function $f$ and F' is the Laplace Transform of the modified dynamic function $f'$.

6. The method of claim 1, wherein the given computing system is a digital computing system and the system-specific linear synaptic filter H is the discrete-time filter.

7. The method of claim 6, wherein the given computing system comprises hardware configured to perform computation using discrete time steps.

8. The method of claim 1, wherein the connection weights are factorized.

9. The method of claim 1, wherein each node comprises a nonlinear component.

10. The method of claim 9, wherein the nonlinear component comprises a time-varying nonlinearity.

11. The method of claim 1, wherein the plurality of temporal filters comprises a plurality of different types of temporal filters, wherein each type of temporal filter is associated with at least one node in the plurality of nodes whereby the plurality of temporal filters are heterogeneously distributed across the plurality of nodes.

12. The method of claim 1, wherein the desired dynamic function $f$ comprises at least one desired delay.

13. The method of claim 12, wherein the at least one desired delay is a controllable delay.

14. The method of claim 12, wherein the at least one desired delay comprises a plurality of delays arranged into a delay bank.

15. The method of claim 1, wherein the desired dynamic function $f$ is approximated using Padé approximants.

16. The method of claim 12, wherein the desired dynamic function $f$ is approximated using Padé approximants.

17. A data processing system comprising:
   a non-transitory computer readable medium storing computer readable instructions and a data structure configured to compute a desired dynamic function, wherein the data structure comprises a plurality of nodes, each node having a node input and a node output, and the plurality of nodes being arranged into a plurality of layers of nodes including at least one input layer and at least one output layer; and
   a computer processor operable to execute the computer readable instructions stored on the computer readable medium using the data structure to compute the desired dynamic function;
   wherein the data structure is defined by
   identifying a system-specific synaptic filter H of the computer processor;
   determining the desired dynamic function $f$ to be computed by the plurality of nodes;

defining at least one node response function for the plurality of nodes, wherein the at least one node response function is defined to receive varying inputs over time at each node input and produce varying outputs over time at each node output;

associating a plurality of temporal filters with the plurality of nodes, wherein at least one particular temporal filter of the plurality of temporal filters is associated with each node in the plurality of nodes;

determining a mapping function corresponding to the system-specific synaptic filter H, wherein the mapping function is selected from a plurality of potential mapping functions, wherein the plurality of potential mapping functions include a first set of mapping functions usable to account for discrete time synaptic filters and a second set of mapping functions usable to account for continuous time synaptic filters;

determining a modified dynamic function $f'$ based on the desired dynamic function $f$ using the selected mapping function, wherein the modified dynamic function $f'$ is determined to account for the system-specific synaptic filter H; and using the at least one node response function and the at least one temporal filter to determine connection weights between the plurality of nodes in the artificial neural network to match the modified dynamic function $f'$, wherein each connection weight is coupled to at least one of a corresponding node input or a corresponding node output and each connection weight is configured to be multiplied by at least one of the input received by the corresponding node input or the output produced by the corresponding node output whereby the connection weights enable the plurality of nodes to compute the desired dynamic function $f$ based on input received at the at least one input layer.

18. The data processing system of claim 17, wherein the system-specific synaptic filter H is a discrete time filter and the modified dynamic function $f'$ is determined according to:

$$f'(x,u)=\Sigma_{i=0}^{k} \dot{c}_i x[t+i]$$

where $\dot{c}_i$ are coefficients of the filter, x represents a system state, and u represents a system input.

19. The data processing system of claim 17, wherein the system-specific synaptic filter H is a continuous time filter and the modified dynamic function $f'$ is determined according to:

$$f'(x,u)=\Sigma_{i=0}^{k} c_i x^{(i)}$$

where $c_i$ are coefficients of the filter, x represents a system state, u represents a system input, and $x^{(i)}$ denotes the $i^{th}$ derivative of x(t).

20. The data processing system of claim 17, wherein the system-specific synaptic filter H is a discrete time filter and the modified dynamic function $f'$ is determined according to:

$$F'\left(\frac{1}{H}\right) = F$$

where F is the z-Transform of the desired dynamic function $f$ and F' is the z-Transform of the modified dynamic function $f'$.

21. The data processing system of claim 17, wherein the system-specific synaptic filter H is a continuous time filter and the modified dynamic function $f'$ is determined according to:

$$F'\left(\frac{1}{H}\right) = F$$

where F is the Laplace Transform of the desired dynamic function $f$ and F' is the Laplace Transform of the modified dynamic function $f'$.

22. The data processing system of claim 17, wherein the computer processor is a digital processor and the system-specific linear synaptic filter H is a discrete-time linear synaptic filter.

23. The data processing system of claim 22, wherein the computer processor comprises hardware configured to perform computation using discrete time steps.

24. The data processing system of claim 17, wherein the computer readable instructions are implemented in hardware selected from the group consisting of neuromorphic hardware, digital hardware, analog hardware and combinations thereof.

25. The data processing system of claim 17, wherein the plurality of layers of nodes includes at least one intermediate layer coupled between the at least one input layer and the at least one output layer.

26. The data processing system of claim 17, wherein the at least one input layer is configured to receive the input as a scalar or a multi-dimensional vector.

27. The data processing system of claim 17, wherein the plurality of temporal filters comprises a plurality of different types of temporal filters, wherein each type of temporal filter is associated with at least one node in the plurality of nodes whereby the plurality of temporal filters are heterogeneously distributed across the plurality of nodes.

28. The data processing system of claim 17, wherein the at least one input layer is configured to receive the input as a multi-dimensional vector and the plurality of temporal filters are distributed across the plurality of nodes to provide dimension-specific temporal filters corresponding to the dimensions of the multi-dimensional vector.

29. The data processing system of claim 17, wherein the desired dynamic function $f$ comprises at least one desired delay.

30. The data processing system of claim 29, wherein the at least one desired delay is a controllable delay.

31. The data processing system of claim 29, wherein the at least one desired delay comprises a plurality of delays arranged into a delay bank.

32. The data processing system of claim 17, wherein the desired dynamic function $f$ is approximated using Padé approximants.

33. The data processing system of claim 29, wherein the desired dynamic function $f$ is approximated using Padé approximants.

34. A computer program product comprising a non-transitory computer readable medium storing computer readable instructions for implementing an artificial neural network for dynamic computing applications on a given computing system, the artificial neural network comprising a plurality of nodes, each node having an input and an output, wherein the computer readable instructions are defined to configure a processor to:

specify a desired dynamic function $f$ to be computed;

define at least one node response function for the plurality of nodes, wherein the at least one node response function is defined to receive varying inputs over time at each node input and produce varying outputs over time at each node output;

associate a plurality of temporal filters with the plurality of nodes, wherein at least one particular temporal filter of the plurality of temporal filters is associated with each node in the plurality of nodes;

determine a system-specific synaptic filter H of the given computing system, wherein the system-specific synaptic filter H is one of a discrete time filter and a continuous time filter;

determine a modified dynamic function $f'$ based on the desired dynamic function $f$ and the system-specific synaptic filter H, wherein the modified dynamic function $f'$ is determined to account for the system-specific synaptic filter H;

use the at least one node response function and the plurality of temporal filters to determine connection weights between the plurality of nodes in the artificial neural network to match the modified dynamic function $f'$, wherein each connection weight is coupled to at least one of a corresponding node input or a corresponding node output and each connection weight is configured to be multiplied by at least one of the input received by the corresponding node input or the output produced by the corresponding node output; and operate the artificial neural network on the given computing system using the determined connection weights to compute the desired dynamic function $f$;

wherein the computer readable instructions enable the processor to account for the system-specific synaptic filter H when the system-specific synaptic filter H is the discrete time filter and when the system-specific synaptic filter H is the continuous time filter.

35. The computer program product of claim 34, wherein the computer readable instructions are defined to configure a processor to, when the system-specific synaptic filter H is the discrete time filter, determine the modified dynamic function $f'$ according to:

$$f'(x,u) = \Sigma_{i=0}^{k} \bar{c}_i x[t+i]$$

where $\bar{c}_i$ are coefficients of the filter, x represents a system state, and u represents a system input.

36. The computer program product of claim 34, wherein the computer readable instructions are defined to configure a processor to, when the system-specific synaptic filter H is the continuous time filter, determine the modified dynamic function $f'$ according to:

$$f'(x,u) = \Sigma_{i=0}^{k} c_i x^{(i)}$$

where $c_i$ are coefficients of the filter, x represents a system state, u represents a system input, and $x^{(i)}$ denotes the $i^{th}$ derivative of x(t).

37. The computer program product of claim 34, wherein the computer readable instructions are defined to configure a processor to, when the system-specific synaptic filter H is the discrete time filter, determine the modified dynamic function $f'$ according to:

$$F'\left(\frac{1}{H}\right) = F$$

where $\bar{F}$ is the z-Transform of the desired dynamic function $f$ and $F'$ is the z-Transform of the modified dynamic function $f'$.

38. The computer program product of claim 34, wherein the computer readable instructions are defined to configure a processor to, when the system-specific synaptic filter H is the continuous time filter, determine the modified dynamic function $f'$ according to:

$$F'\left(\frac{1}{H}\right) = F$$

where F is the Laplace Transform of the desired dynamic function $f$ and F' is the Laplace Transform of the modified dynamic function $f'$.

39. The computer program product of claim 34, wherein the connection weights are factorized.

40. The computer program product of claim 34, wherein each node comprises a nonlinear component.

41. The computer program product of claim 40, wherein the nonlinear component comprises a time-varying nonlinearity.

42. The computer program product of claim 34, wherein the plurality of temporal filters comprises a plurality of different types of temporal filters, and the computer readable instructions are defined to configure a processor to associate each type of temporal filter with at least one node in the plurality of nodes and to distribute the plurality of temporal filters heterogeneously across the plurality of nodes.

43. The computer program product of claim 34, wherein the desired dynamic function $f$ comprises at least one desired delay.

44. The computer program product of claim 43, wherein the at least one desired delay is a controllable delay.

45. The computer program product of claim 43, wherein the at least one desired delay comprises a plurality of delays arranged into a delay bank.

46. The computer program product of claim 34, wherein the desired dynamic function $f$ is approximated using Padé approximants.

47. The computer program product of claim 43, wherein the desired dynamic function $f$ is approximated using Padé approximants.

* * * * *

UNITED STATES PATENT AND TRADEMARK OFFICE
CERTIFICATE OF CORRECTION

PATENT NO. : 11,238,337 B2
APPLICATION NO. : 15/243223
DATED : February 1, 2022
INVENTOR(S) : Aaron Russell Voelker and Christopher David Eliasmith It is certified that error appears in the above-identified patent and that said Letters Patent is hereby corrected as shown below:

In the Claims

The formula in Claim 4, Column 18, Lines 1-3, should read:

$$F'\left(\frac{1}{H}\right) = \overline{F}$$

The formula in Claim 20, Column 19, Lines 56-59, should read:

$$F'\left(\frac{1}{H}\right) = \overline{F}$$

Signed and Sealed this
Twelfth Day of July, 2022

*Katherine Kelly Vidal*
*Director of the United States Patent and Trademark Office*